Sept. 12, 1950  B. F. KELLEY  2,522,377
CLUTCH AND BRAKE MECHANISM FOR CATHEAD ASSEMBLY
Filed Aug. 15, 1946  3 Sheets-Sheet 1

INVENTOR.
Ben F. Kelley
BY
ATTORNEY

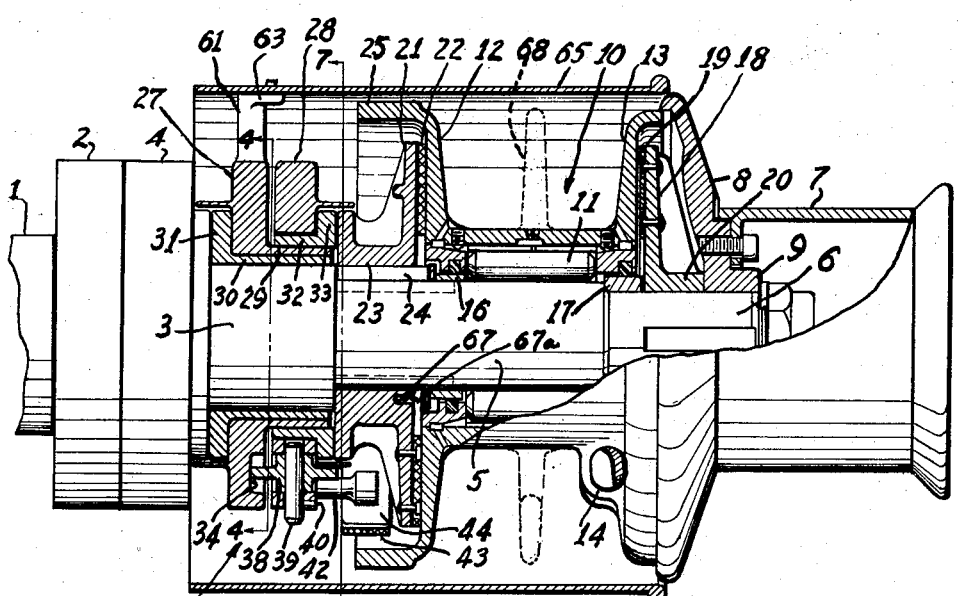

Sept. 12, 1950  B. F. KELLEY  2,522,377
CLUTCH AND BRAKE MECHANISM FOR CATHEAD ASSEMBLY
Filed Aug. 15, 1946  3 Sheets-Sheet 3

INVENTOR.
Ben F. Kelley
BY
R. Werlin
ATTORNEY

Patented Sept. 12, 1950

2,522,377

UNITED STATES PATENT OFFICE 2,522,377

CLUTCH AND BRAKE MECHANISM FOR CATHEAD ASSEMBLY

Benjamin F. Kelley, Tulsa, Okla.

Application August 15, 1946, Serial No. 690,674

3 Claims. (Cl. 192—17)

This invention relates to cathead assemblies and particularly to a cathead assembly employing a novel form of clutch mechanism for controlling the operation of a cathead spinner.

A principal object of this invention is the provision of the cathead assembly which employs a greatly simplified form of clutch mechanism for operation of the cathead spinner with consequent reduction in first costs and maintenance costs.

A further object of this invention is the provision in a cathead assembly of a relatively simple form of cam and roller clutch actuating member for effectively operating the cathead spinner.

Still another object of this invention is to provide a cathead assembly employing a relatively simple and efficient form of brake for controlling the cathead spinner during stages in operation of the assembly.

An additional object of this invention is the provision of an improved cathead assembly embodying various safety features of important utility in its operation.

Other and more specific objects and advantages of this invention will be apparent from the following detailed description when read in conjunction with the accompanying drawings which illustrate useful embodiments in accordance with this invention.

In the drawings:

Fig. 3 is a side elevation, some of the parts being broken away, illustrating the arrangement of the parts of the cathead assembly shown in Figs. 1 and 2;

Fig. 4 is a view taken along line 4—4 of Fig. 3 of one of the novel clutch actuating elements forming a part of this invention;

Figure 6:
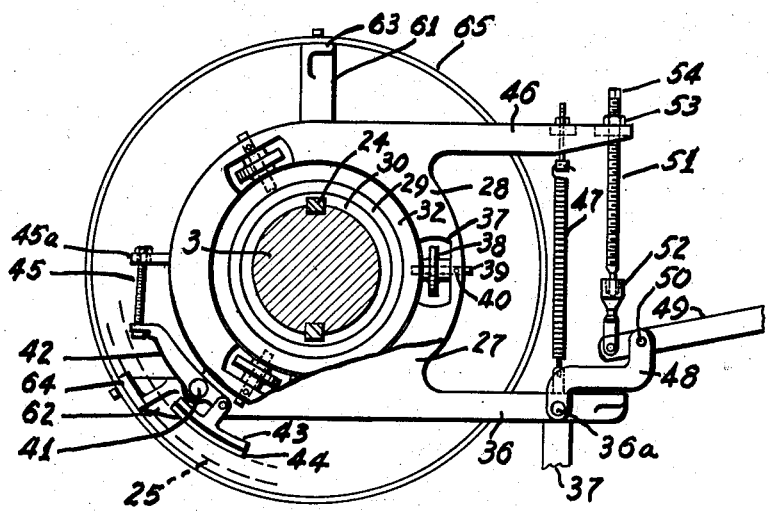
Figure 7:
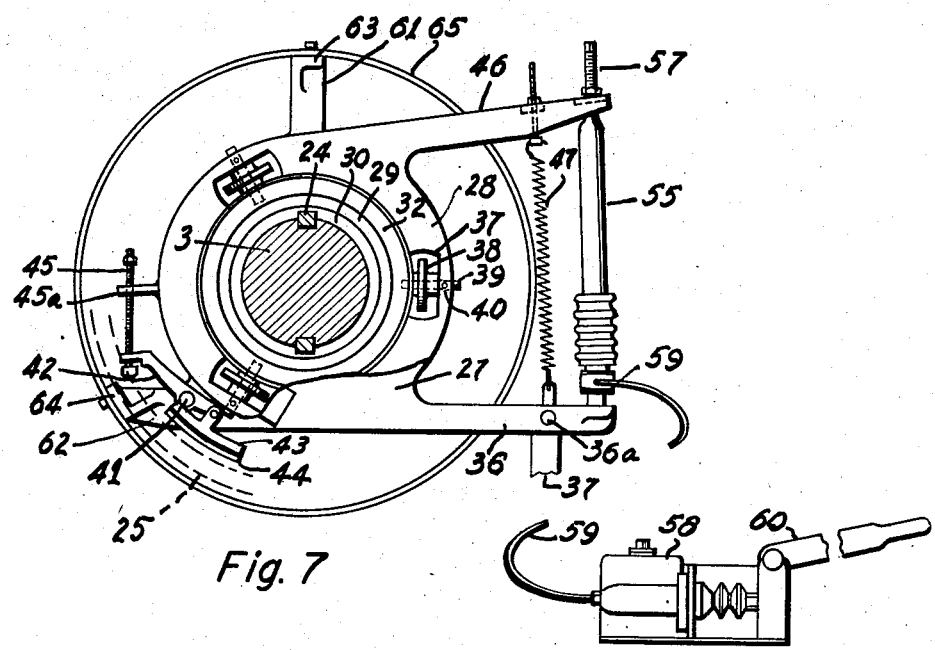

Fig. 5 is a view taken along line 5—5 of Fig. 4 of a detail of the clutch element shown in Fig. 4; and Figs. 6 and 7 are similar views taken along line 7—7 of Fig. 3 illustrating particularly two positions of the clutch actuating elements of the cathead assembly, Fig. 6 illustrating a mechanical arrangement of parts for operating the clutch and Fig. 7 a hydraulic arrangement for similarly operating the clutch.

Referring to the drawings, there is shown a portion of a conventional draw-works shaft 1 carrying a coupling member 2 to which a stub shaft 3 is removably connected by means of a complementary coupling member 4. Stub shaft 3 is provided with an intermediate section 5 and an outer section 6 of successively reduced diameters. A cathead drum 7, of conventional form, is removably bolted to an annular flange 8, provided with a central hub 9, which is rigidly mounted on the outer end of section 6 of the stub shaft. Mounted on intermediate section 5 of the stub shaft is a spinner, indicated generally by the numeral 10, also of generally conventional form. Spinner 10 is arranged for rotation about intermediate section 5 on roller bearings 11 and is provided with the usual end flanges 12 and 13 and with a line holder 14, adjacent flange 13, for the reception of a spinning line 15, which is adapted to be wound about spinner 10 in connection with the use of the spinner for the various operations normally conducted by means of cathead spinners of this general type. When it is desired to use the cathead assembly for breaking out pipe, spinner 10 may be replaced by a double-spool spinner, the partition flange 68 being indicated in broken lines in Fig. 3, to illustrate this form of spinner.

The arrangement of spinner 10 on section 5 of the stub shaft is such as to permit a limited degree of longitudinal movement of the spinner along stub shaft 3, the ends of the spinner hub being provided with oil seals enclosed by sleeves 16 and 17 which surround sections 5 and 6 respectively, of the stub shaft. Interposed between flange 8 of the cathead and flange 13 of the spinner is a circular clutch plate 18 provided, on the face adjacent flange 13, with annular friction facing, 19. Clutch plate 18 is provided with a central hub 20 by means of which it is mounted on section 6 of the stub shaft and keyed thereto for rotation with the shaft and cathead. Mounted on the inner end of section 5 of the stub shaft is a second clutch plate, referred to herein as pressure plate 21, which is provided with an annular friction facing 22 for engagement with the adjacent face of flange 12 of the spinner. Pressure plate 21 is provided with a cylindrical hub 23 which is keyed to section 5 of the stub shaft by means of keys 24, which are adapted to permit limited longitudinal movement of the pressure plate along the shaft while preventing rotation of the pressure plate relative to the shaft. A plurality of coil springs 67, only one of which is shown, are interposed in the convention manner, in compression between pressure plate 21 and spring thrust washer 67a to effect disengagement between pressure plate 21 and flange 12 as well as between clutch plate 18 and flange 13 when the clutching pressure is released. The periphery of the flange 12 of the spinner is provided with an outwardly horizontally extending flange 25, which surrounds the periphery of pressure plate 21 and is spaced therefrom.

Mounted on the inner end of stub shaft 3 between coupling member 4 and the inner face of hub 23 of pressure plate 21 is a clutch actuating member, indicated generally by the numeral 26. Actuating member 26 comprises an annular cam plate 27 and a cooperating annular roller plate 28. Cam plate 27 is provided with a sleeve hub 29 which surrounds shaft 3 and extends outwardly along the shaft between the inner periphery of roller plate 28 and shaft 3. Interposed between hub 29 of plate 27 and the surface of shaft 3 is a sleeve bearing 30 provided at its inner end with an annular flange 31 which forms a thrust bearing between the inner face of cam plate 27 and the opposed face of coupling member 4. Interposed between the outer face of sleeve hub 29 and the inner periphery of roller plate 28 is a cylindrical bearing 32 which is provided at its outer end with an annular flange 33 which forms a thrust bearing between the outer face of roller plate 28 and the adjacent end of hub 23 of pressure plate 21. With this arrangement a degree of relative rotation is provided between cam plate 27 and roller plate 28, while permitting the clutch actuating member, as a whole to remain stationary relative to shaft 3. The face of cam plate 27 adjacent roller plate 28 is provided with cam slots 34, which are generally circumferentially arranged about the face of the plate and, in the embodiment illustrated, are spaced thereon at intervals of approximately 120 degrees. Cam slots 34 are so cut as to provide a depression at one end which slopes upwardly toward the other end of the slot, the lower ends of the slots being curved, as at 35, for the reception of the cooperating rollers 38 to be described hereinafter. Integral with the lower edge of cam plate 27 is an arm 36, extending in the plane of the plate at right angles to the axis thereof, which is arranged for rigid connection at one end by means of a bolt 36a to a post 37 which is normally firmly attached to some portion of the draw-works or the base structure thereof (not shown), whereby cam plate 27 may be held stationary relative to the rotation by shaft 3. Roller plate 28 is provided with a plurality of intersecting windows 37 cut therein at intervals of approximately 120 degrees, in which are mounted rollers 38 which are adapted for cooperation with cam slots 34, serving as cam followers. The diameter of rollers 38 is greater than the thickness of roller plate 28 and the edges of the rollers, therefore, extend outwardly on opposite sides of plate 28. Each of the rollers is mounted upon a shaft 39 which extends radially from the edge of plate 28 through the body thereof and pass through windows 37. Locking pins 40 extend through the side of plate 28 and lock roller shafts 39 and the accompanying rollers in place within windows 37. Mounted on an inward extension of arm 36 is a pivot pin 41 which extends at right angles to the outer face of cam plate 27. A brake arm 42 is pivotally mounted at an intermediate point thereof on pivot pin 41 and at one end of the brake arm there is pivotally connected an arcuate brake shoe 43, provided with a friction facing 44 and arranged for braking engagement with the inner face of flange 25 of the spinner. The opposite end of brake arm 42 is loosely connected by means of a threaded rod 45 to a lug 45a which is rigidly connected to the edge of roller plate 28, thereby forming a lost-motion connection between plates 27 and 28 through brake arm 42. An arm 46, rigidly connected to the upper edge of roller plate 28, extends therefrom generally parallel to arm 36 and a coil spring 47, normally in tension, connects arms 36 and 46. Roller plate 28, is rotatable relative to cam plate 27 about shaft 3 by vertical movement of arm 46 against the resistance of coil spring 47. This movement of plate 28 relative to plate 27 may be effected either by mechanical means or by hydraulically operated means. In Fig. 6, wherein the plates are shown in disengaged position, there is shown a mechanical means for effecting this movement which consists of an S-shaped bracket 48, one end of which is rigidly attached to arm 36. An operating lever 49 is pivoted at 50 in the opposite end of bracket 48 and the inner end of lever 49 is connected by means of a rod 51 to the outer end of arm 46. Rod 51 is threaded and the lower end is connected to the end of lever 49 by means of a swivel socket 52 and the upper end, which is screwed through arm 46, is locked thereto by means of a nut 53 and terminates in a wrench square 54.

Fig. 7, wherein roller plate 28 is shown in the clutch engaging position, illustrates an alternative arrangement of mechanism for operating the clutch actuating member. In this alternative arrangement, a conventional type hydraulic operating cylinder 55 is interposed between the ends of arms 36 and 46, the upper end of cylinder 55 being provided with a threaded adjusting screw 57 which extends through the end of arm 28 and is employed, like threaded rod 51, for adjustment of the clutch actuating member, as will be hereinafter described. Hydraulic fluid for moving cylinder 55 is supplied from a hydraulic pump 58 through a pipe 59, the pump 58 being operated by an operating handle 60 suitably connected thereto.

Figure 1:
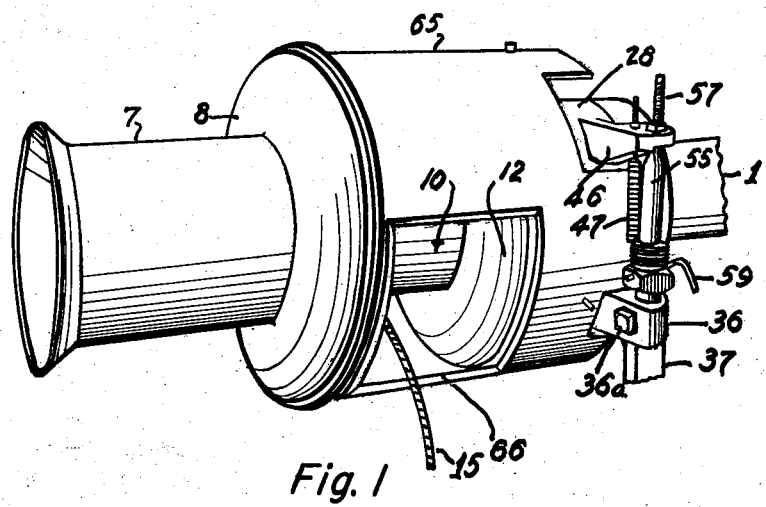
Fig. 1 is a perspective view of a cathead assembly in accordance with this invention wherein an enclosing safety shield is shown in place about the moving members of the assembly.
Figure 2:
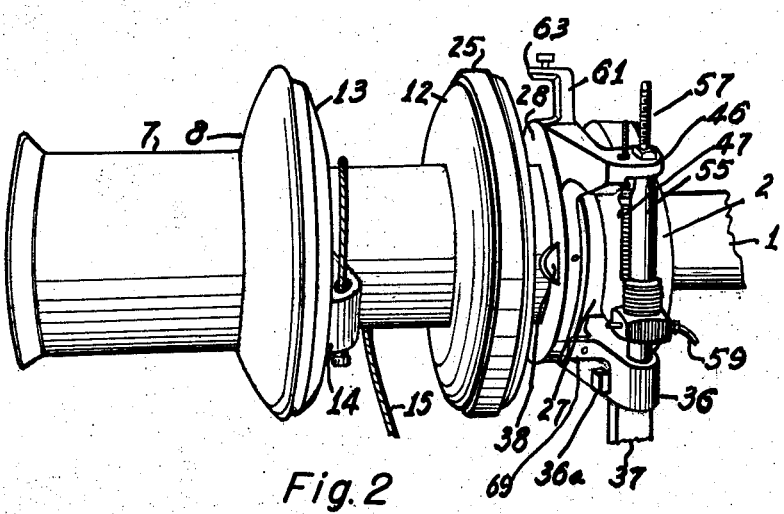
Fig. 2 is a view similar to that of Fig. 1 but showing the safety shield removed from the cathead assembly.

Extending radially from the edge of cam plate 27, are supports 61 and 62 provided with bolt lugs 63 and 64, respectively, and a lug 69 (Fig. 2) on arm 36, all spaced approximately 120 degrees apart, for the supporting attachment thereto of a cylindrical shield 65 which surrounds and encloses the clutch actuating member 26 and spinner 10. Shield 65 is provided with a window 66 which exposes only a small area of the spinner through which spinning line 15 passes.

The cathead assembly above described is operated in the following manner: With clutch actuating member 26 in the disengaged position illustrated, particularly in Fig. 6, draw-works shaft 1 will normally be running, driving stub shaft 3, cathead 7, clutch plate 18, and pressure plate 21. Spinner 10 will be stationary since it will be disengaged from plates 18 and 21 and held against rotation by brake shoe 43 in a manner to be subsequently described. When it is desired to effect engagement of the spinner, handle 49 will be depressed, thereby raising arm 46 against the resistance of coil spring 47 and producing a rotary movement of roller plate 28 about shaft 3. Rollers 38, which are initially in the neutral position, will be seated in the bottoms of cam slots 34 in the position illustrated in solid lines in Fig. 5, and will be caused by the rotary movement of roller plate 28 to roll up the slopes of cam slots 34 toward the upper ends thereof to the position shown in broken lines in Fig. 5. This movement causes roller plate 28 to move longitudinally along shaft 3 against pressure plate 21 thrusting the outer face of the latter into contact with spinner 10 and moving the latter outwardly along section 5 of shaft 3 into contact with the opposed face of clutch plate 18. This action causes opposite ends of the spinner 10 to be gripped tightly by the friction facings 19 and 22 and since plates 18 and 21 are keyed to stub shaft 3 and are rotating therewith, spinner 10 will be rotated thereby so long as roller plate 28 is maintained in the clutch engaging position, and thrusting against pressure plate 21. In this position, flange 33 of bearing 32 will form a bearing surface against which the inner end of hub 23 of pressure plate 21 will rotate. The clutch is released by reverse movement of lever 49, which moves rollers 38 back down the slopes of cam slots 34 to their eventually neutral positions at the bottoms of slots 34. When this reverse movement occurs, the plates 18 and 21 will be released from their engagement with spinner 10 by the thrust of coil springs 67. When the clutch is engaged as described, spinning line 15 will, of course, be wound on the spool of spinner 10 in the conventional manner and will be employed for the purposes for which such spinning lines are usually employed about a drilling rig.

The brake mechanism, which is attached to clutch 26, operates in the following manner: When the clutch is engaged and the plates of the clutch actuating member occupy the positions illustrated particularly in Fig. 7, lug 45a, which is attached to roller plate 28 will have been rotated in a counter-clockwise direction toward the outer end of brake arm 42. This will release the outer end of the brake arm and permit it to rock about shaft 41, lifting brake shoe 43 from contact with the inner surface of flange 25, and thereby releasing its braking action upon flange 25 to permit the rotation of the spinner pursuant to the engaging action of the clutch. As the clutch disengages to release the spinner, lug 45a will rotate in the clockwise direction and, by engaging the nut attached to the upper end of the rod 45, will act to lift the outer end of brake arm 42 and rock brake shoe 43 into engagement with the inner surface of flange 25. This action will stop any rotation of spinner 10 as the clutch pressure is released and when the clutch members attain their neutral position. Otherwise, friction and other effects acting on the spinner through the continued rotation of shaft 3, will tend to rotate spinner 10 and produce undesirable reactions of the spinning line 15. The brake is thus automatically released when the clutch is moving toward the engaging position, and similarly the brake will become automatically engaged with flange 25 when the clutch is released and returned to the neutral position.

By the employment of the clutch and clutch actuating member of the form heretofore described, it will be evident that a very simple, yet positive acting form of clutch is provided for use with a cathead assembly which is of very simple construction and efficient in operation.

The vertical distance between the maximum points of travel of rollers 38 in cam slots 34 will determine the degree of longitudinal movement or thrust of roller plate 28 in effecting engagement and disengagement of the clutch. The length and slope of the cam slot will control the pressure characteristics and the rate of application of the clutching pressure and these factors may be varied, if desired, by varying the depth, slope and length of the cam slots.

Adjustment of the plates of the clutch actuating member to compensate particularly for wear may be made simply by suitable adjustment merely of the length of rod 51 in the case of the mechanical construction shown in Fig. 6, or of the adjusting screw 57 in the case of the hydraulic arrangement shown in Fig. 7.

It will be understood that numerous alterations or modifications may be made in the details of the structure of this invention without departing from the scope of the appended claims but within the spirit of this invention.

What I claim and desire to secure by Letters Patent is:

1. A cathead assembly including in combination with a driven cathead shaft carrying a line-spooling spinner releasably engageable for rotation therewith and a clutch slidable on said shaft for driving said spinner, a clutch actuating means comprising a pair of adjacent members, one of which is reversibly slidable on said shaft relative to the other for actuating said clutch, an interengaged cam connection between said members reversibly operative upon relative rotation of said members to produce said sliding movement of one of said members, means for rotating one of said members relative to the other, and a brake mechanism connected to both said members and releasably engageable with said spinner in response to the relative rotational movement of said members.

2. A cathead assembly including in combination with a driven cathead shaft carrying a line-spooling spinner releasably engageable for rotation therewith and a clutch slidable on said shaft for driving said spinner, a clutch actuating means comprising a pair of adjacent members, one of which is reversibly slidable on said shaft relative to the other for actuating said clutch, an interengaged cam-and-follower connection between said members reversibly operative upon relative rotation of said members to produce said sliding movement of one of said members, means for rotating one of said members relative to the other, and a brake mechanism connected to both said members and releasably engageable with said spinner in response to the relative rotational movement of said members.

3. A cathead assembly including in combination with a driven cathead shaft carrying a line-spooling spinner releasably engageable for rotation therewith and a clutch slidable on said shaft for driving said spinner, a clutch actuating means comprising a pair of adjacent members one of which is reversibly slidable on said shaft relative to the other for actuating said clutch, an interengaged cam-and-follower connection between said members reversibly operative upon relative rotation of said members to produce said sliding movement of one of said members relative to the other, means for rotating one of said members relative to the other, a brake arm rockably supported on one of said members, a brake shoe pivotally mounted on one end of said brake arm and releasably engageable with said spinner, and a lost-motion connection between the opposite end of said brake arm and the other of said members operative in response to said relative rotation of said members to cause said brake to control the rotation of said spinner.

BENJAMIN F. KELLEY.

REFERENCES CITED

The following references are of record in the file of this patent:

UNITED STATES PATENTS

| Number | Name | Date |
|---|---|---|
| 1,579,903 | Yungling | Apr. 6, 1926 |
| 1,625,769 | Erstad | Apr. 19, 1927 |
| 1,683,715 | Erban | Sept. 11, 1928 |
| 1,912,645 | Le Tourneau | June 6, 1933 |
| 2,189,373 | Steel | Feb. 6, 1940 |
| 2,290,735 | Braner | July 21, 1942 |
| 2,348,891 | Eason | May 16, 1944 |
| 2,355,861 | Harlin | Aug. 15, 1944 |
| 2,391,939 | Bannister | Jan. 1, 1946 |
| 2,446,138 | Lambert | July 27, 1948 |
| 2,449,893 | Gilman | Sept. 21, 1948 |